Nov. 30, 1943.    J. A. HUNT ET AL    2,335,762
BELLOWS OPERATED MECHANISM
Filed Dec. 30, 1942

Inventors
J. A. Hunt
A. E. Moreillon
By Glascock Downing Luttle
Attys.

Patented Nov. 30, 1943

2,335,762

UNITED STATES PATENT OFFICE 2,335,762

BELLOWS OPERATED MECHANISM

Joseph Anthony Hunt and Albert Edmund Moreillon, Redditch, England, assignors to The Heywood Compressor Company Limited, Redditch, England, a British company Application December 30, 1942, Serial No. 470,684
In Great Britain April 23, 1941

2 Claims. (Cl. 137—53)

This invention relates to bellows operated mechanisms of the type in which pressure fluid (such as compressed air in a reservoir) applied to a bellows causes the latter to operate a release valve which serves to prevent the pressure in the reservoir exceeding a predetermined value, and the object of the invention is to provide simple and efficient means for preventing release or escape of the reserve of pressure fluid acting upon the bellows, should the latter leak in service, whilst maintaining sufficient pressure in the reservoir to ensure the functioning of the installation of which it forms part.

Our invention comprises the arrangement wherein a spring loaded part which is moved to open the release valve by the pressure acting upon the bellows, has a valve seating ring thereon or a resilient seating therein which serves in conjunction with a fixed resilient seating or valve seating ring to isolate the space in which the bellows functions from the atmosphere upon leakage of the bellows and upon a drop of the reservoir pressure to an amount at which the release valve causes charging of the reservoir, the valve area being such that sufficient pressure is maintained in the reservoir to ensure the functioning of the installation of which it forms part even when leakage of the bellows occurs.

Referring to the accompanying sheet of explanatory drawings.

Figure 1:
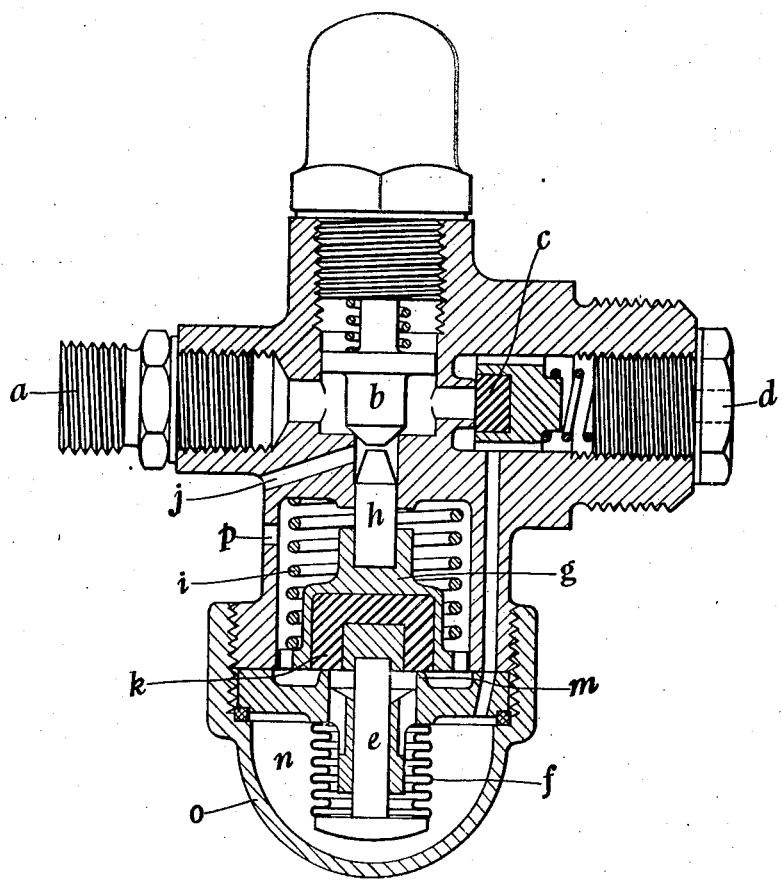
Figure 1 is a sectional elevation of a compressed air reservoir charging device with its bellows operated mechanism arranged in one convenient form in accordance with this invention.

The device illustrated in Figure 1 comprises a compressed air supply branch $a$, a spring loaded release valve $b$, a valve $c$ controlling the delivery of compressed air to the branch $d$ leading to a reservoir, a plunger $e$ and bellows $f$ loaded by the air pressure in the branch $d$ and serving to move the spring loaded member $g$ in order to cause the part $h$ thereon to open the valve $b$, when the pressure in the branch $d$ exceeds a predetermined amount and is able to overcome the spring $i$. There is an atmospheric connection at $j$ by which air released upon the opening of the valve $b$ can escape to atmosphere.

When the pressure on the bellows $f$ acting through the plunger $e$ is unable to move the part $g$ against the load of the spring $i$, a rubber or like seating material $k$ within the part $g$ seats upon a valve ring $m$.

If the bellows $f$ should leak, compressed air will escape only momentarily through the bellows to atmosphere by way of the space around the part $g$, and the vent $p$, for the fall in pressure in the bellows space $n$ within the cover $o$ will result in the spring $i$ closing the seating material $k$ upon the valve ring $m$. The bellows space $n$ is then isolated from the atmosphere. Under such conditions, the reservoir will be charged from the branch $a$ up to a pressure which is determined by the area of the spring loaded member $g$ exposed to such pressure and the strength of the spring $i$.

Figure 2:
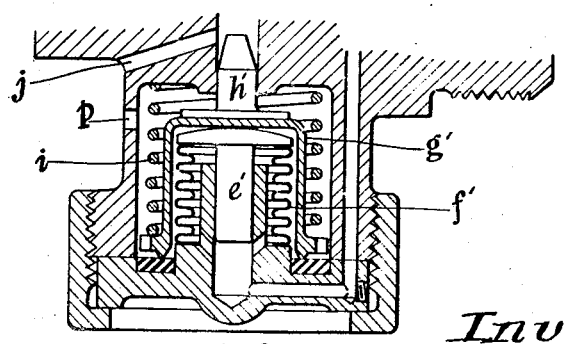
Figure 2 illustrates a modified arrangement of the bellows.

In the modification shown in Figure 2, the bellows $f'$ and plunger $e'$ are arranged within the member $g'$ loaded by the spring $i$. In this case the release valve will be opened by the part $h'$ at a lower reservoir pressure when the bellows leaks than when it is intact and functioning, because of the increased area of $g'$ exposed to reservoir pressure on such failure.

With both forms of safety device, leakage of the bellows may not involve any appreciable loss of the compressed air from the reservoir, the pressure in the latter can still be maintained sufficient to work any appliances supplied thereby until a new bellows can be inserted in the device, but the production of excessive pressure in the reservoir, with over-loading of the compressor, is prevented.

What we claim is:

1. In a bellows operated mechanism, a body having a passage for pressure fluid, a second passage communicating at one end with the atmosphere and at the other end with said pressure fluid passage, said pressure fluid passage being adapted for connection to a fluid reservoir, a release valve located in said pressure fluid passage, a bellows located in said second passage to prevent flow therethrough, a spring loaded part operable by the pressure of said fluid acting on one side of the bellows to open said release valve, and valve means controlled by said spring loaded part and operable to prevent flow through said second passage in case of leakage of said bellows and upon a drop of fluid pressure in said pressure fluid passage, said valve means being constructed and arranged to operate in conjunction with said spring loaded part to prevent total release of pressure fluid from the pressure fluid passage in the event of leakage of said bellows.

2. A bellows operated mechanism as claimed in claim 1 wherein said spring loaded part is hollow and accommodates said bellows.

JOSEPH ANTHONY HUNT.
ALBERT EDMUND MOREILLON.